(No Model.)
N. LINSLEY & C. E. FORRY.
SURFACE GAGE.
No. 381,937. Patented May 1, 1888.
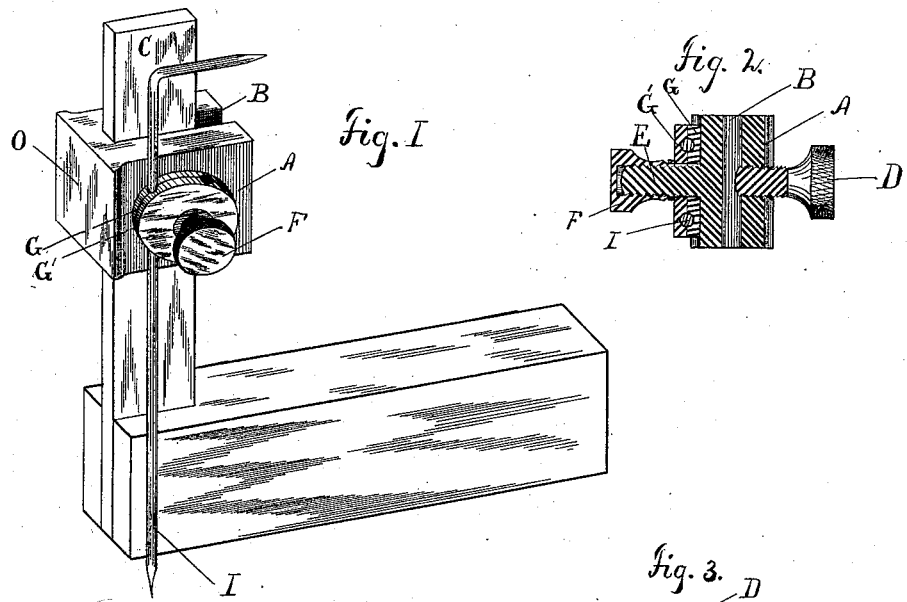
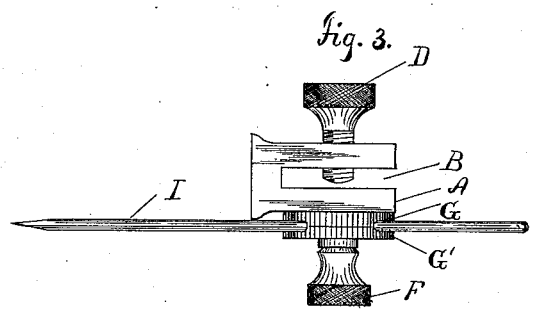
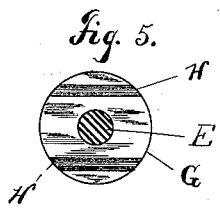
Witnesses.
C. W. Graham,
L. M. Currier
Inventors,
Newton Linsley,
Charles E. Forry,
By Niles & Greene,
Attorneys.

UNITED STATES PATENT OFFICE.

NEWTON LINSLEY AND CHARLES E. FORRY, OF FREEPORT, ILLINOIS.

SURFACE-GAGE.

SPECIFICATION forming part of Letters Patent No. 381,937, dated May 1, 1888.

Application filed March 5, 1887. Serial No. 229,784. (No model.)

*To all whom it may concern:*

Be it known that we, NEWTON LINSLEY and CHARLES E. FORRY, residents of Freeport, in the county of Stephenson and State of Illinois, have invented certain new and useful Improvements in Mechanics' Gages; and we do hereby declare the following to be a full, clear, and exact description of the invention, such as will enable others skilled in the art to which it pertains to make and use the same.

The object of this invention is to provide an implement to serve as a gage for widths, depths, and for plane surfaces.

Letters of reference in this specification indicate the same parts in each of the accompanying drawings, wherein—

Figure 1 shows the device attached to a machinist's try-square. Fig. 2 is a central horizontal section, the device being in the position of Fig. 1. Fig. 3 shows the device in the same position, seen from above. Figs. 4 and 5 are parts to be described.

A is a block of metal formed with a slot, B, and provided with a set screw, D, whereby it may be attached to a flat bar, such as a scale or try-square blade. The block has two pairs of parallel faces at right angles to each other and all perpendicular to the slot, and the inner edge or bottom of the slot is parallel to one of the said faces, O, Fig. 1, so that when the block is clamped upon a flat straight-edged blade the face O is parallel to the edge of said blade, and the two faces at right angles to the face O are also at right angles to the edge of the blade, and form therewith a try-square. It bears upon one side a gage bar or rod so mounted upon the block that it may be revoluble upon its own longitudinal axis, and also bodily in a plane cutting said axis, and so that it may be fixed in any of its positions.

From the side of the block opposite to the set-screw D projects a screw-threaded gudgeon, E, over the extremity of which is screwed a milled nut, F, pressing two disks, G G', upon each other and against the block A. Each disk is provided upon one face with a nearly semi-cylindrical groove, H, Fig. 5, and these, when the disks are properly adjusted with reference to each other, form an approximately cylindrical opening tangent to a circle described about a point on the axis or gudgeon E, and at such distance therefrom as may be determined when the grooves are cut. The opening formed as described is adapted to receive the rod I, which is of such diameter that the disks when firmly clamped together exert a considerable pressure upon it. Both its ends are pointed, and one is bent at right angles to the main portion of the rod. One of the principal uses of the implement is the testing of plane surfaces, the block A being used as a base, resting on the surface to be tested, or being clamped to a try-square blade whose stock serves as a base, in the manner illustrated in Fig. 1. In either case the base of the implement rests on a portion of the plane to be tested, and one of the points of the rod I is brought into contact with the plane at a point outside the base by revolving the plates G G' upon their axis. The base may then be moved as desired until the point of the rod is brought into contact with all points of the plane successively.

We also use with the block A a second rod, Fig. 4, terminating at one end in a plane perpendicular to its longitudinal axis, and provided at the other end with a marking-spur. This bar may replace the bar I in the same grooves, or may be used in other similar grooves H, where it is held by the same means. It is used for gaging depths, or the distance of one surface below another, either with the block A alone or mounted upon the try-square, the smooth end of the rod touching the lower of the two surfaces operated upon. The same bar is employed for gaging widths, the spur acting as in the ordinary scratch or thumb gage and the plane face of the block A serving as a guiding surface.

Both the gage-rods may be used at the same time, and this is often convenient, as when it is desired to ascertain the respective distances of two surfaces from a third surface, or where it is desirable to use the implement as an inside caliper, the outer ends of the two rods being the contact-points of the implement, and the distance between said ends being regulated by sliding the rods longitadinally in their bearings.

What we claim is—

1. The plane-faced block A, provided with the plane-faced slot B and set-screw D, adapting it to be secured upon a flat bar, in combination with a gage-rod adjustably clamped upon one side of said block and movable only in a plane parallel to said slot, whereby the implement may be readily secured upon a try-square blade or may be used alone with either of its faces serving as the base or working-face.

2. In an implement of the class described, the combination, with a block having a plane face and a slot or groove whose sides and bottom are all planes perpendicular to said face, of a set-screw adapted to secure a flat bar in said slot, and a gage rod adjustably clamped upon one side of said block, substantially as and for the purpose set forth.

In testimony whereof we have signed this specification in the presence of two subscribing witnesses.

NEWTON LINSLEY.
CHARLES E. FORRY.

Witnesses:
C. W. GRAHAM,
J. A. CRAIN.